(12) United States Patent
Healy et al.

(10) Patent No.: US 12,130,916 B2
(45) Date of Patent: Oct. 29, 2024

(54) APPARATUS AND METHODS TO CLASSIFY MALWARE WITH EXPLAINABILITY WITH ARTIFICIAL INTELLIGENCE MODELS

(71) Applicant: Musarubra US LLC, San Jose, CA (US)

(72) Inventors: Sorcha Healy, Mahon (IE); Christiaan Beek, Schiphol-Rijk (NL)

(73) Assignee: Musarubra US LLC, San Jose, CA (US)

( * ) Notice: Subject to any disclaimer, the term of this patent is extended or adjusted under 35 U.S.C. 154(b) by 214 days.

(21) Appl. No.: 17/838,973

(22) Filed: Jun. 13, 2022

(65) Prior Publication Data

US 2023/0401314 A1    Dec. 14, 2023

(51) Int. Cl.
| | |
|---|---|
| *G06F 21/56* | (2013.01) |
| *G06F 21/53* | (2013.01) |
| *G06N 3/045* | (2023.01) |
| *G06N 3/08* | (2023.01) |

(52) U.S. Cl.
CPC ............. *G06F 21/56* (2013.01); *G06F 21/53* (2013.01); *G06N 3/045* (2023.01); *G06N 3/08* (2013.01); *G06F 2221/033* (2013.01); *G06F 2221/034* (2013.01)

(58) Field of Classification Search
CPC .... G06F 21/53; G06F 21/56; G06F 2221/033; G06F 2221/034; G06N 3/045; G06N 3/08
See application file for complete search history.

(56) References Cited

U.S. PATENT DOCUMENTS

| | | | |
|---|---|---|---|
| 2019/0108447 A1* | 4/2019 | Kounavis | G06V 10/82 |
| 2019/0272375 A1* | 9/2019 | Chen | G06N 5/045 |
| 2021/0232915 A1* | 7/2021 | Dalli | G06N 3/049 |
| 2022/0121744 A1* | 4/2022 | Mishra | G06N 3/044 |
| 2022/0179955 A1* | 6/2022 | Yi | G06N 3/045 |

* cited by examiner

*Primary Examiner* — Theodore C Parsons
(74) *Attorney, Agent, or Firm* — Hanley, Flight & Zimmerman, LLC

(57) ABSTRACT

Apparatus, systems, and methods to classify malware with explainability are disclosed. An example apparatus includes at least one memory; instructions in the apparatus; and processor circuitry. The example processor circuitry is to execute the instructions to: generate feature vectors from a first input; train a neural network model using a first portion of the feature vectors; add one or more fully connected layers to the trained neural network model to form a hybrid model; validate the hybrid model using a second portion of the feature vectors; and deploy the validated hybrid model as a malware classifier, the malware classifier to provide a malware classification with explainability in response to a second input.

20 Claims, 11 Drawing Sheets

APPARATUS AND METHODS TO CLASSIFY MALWARE WITH EXPLAINABILITY WITH ARTIFICIAL INTELLIGENCE MODELS

FIELD OF THE DISCLOSURE

This disclosure relates generally to malware, and, more particularly, to apparatus and methods to classify malware with explainability using artificial intelligence models.

BACKGROUND

Malware (e.g., viruses, worms, trojans, ransomware) is malicious software disseminated by attackers to launch a wide range of security attacks, such as stealing users' private information, hijacking devices remotely to deliver massive spam emails, infiltrating a users' online account credentials, etc. The introduction of malware to a computing system may cause serious damages to computer equipment and/or data and/or may cause significant financial loss to Internet users and/or corporations.

BRIEF DESCRIPTION OF THE DRAWINGS

In general, the same reference numbers will be used throughout the drawing(s) and accompanying written description to refer to the same or like parts. The figures are not to scale.

Figure 1:
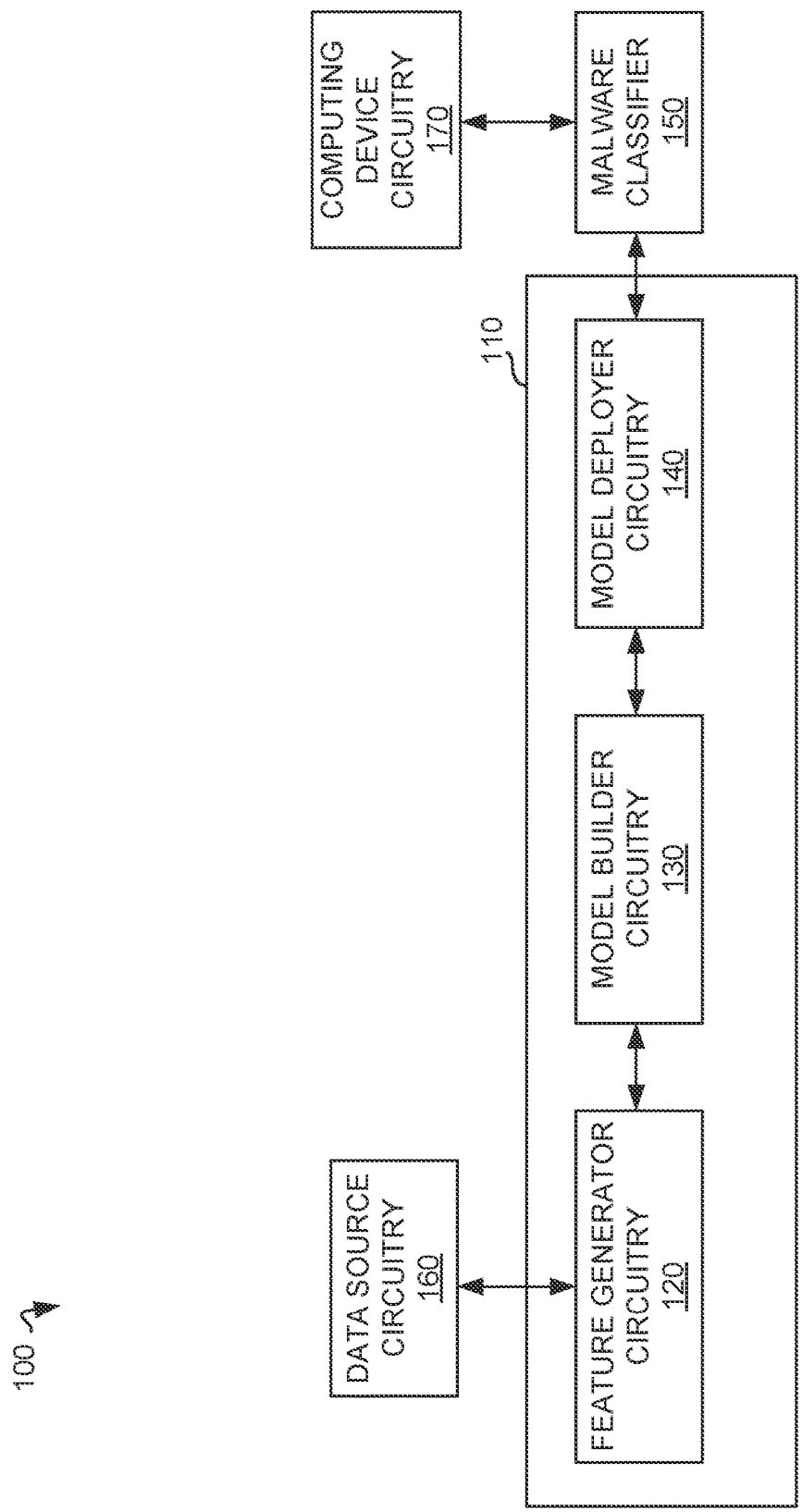
FIG. 1 illustrates an example framework or environment in which a malware classification apparatus trains and deploys one or more models for malware classification in accordance with teachings disclosed herein.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to real time +/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, the terms "system," "unit," "module," "engine," etc., may include a hardware and/or software system that operates to perform one or more functions. For example, a module, unit, or system may include a computer processor, controller, and/or other logic-based device that performs operations based on instructions stored on a tangible and non-transitory computer readable storage medium, such as a computer memory. Alternatively, a module, unit, engine, or system may include a hard-wired device that performs operations based on hard-wired logic of the device. Various modules, units, engines, and/or systems shown in the attached figures may represent the hardware that operates based on software or hardwired instructions, the software that directs hardware to perform the operations, or a combination thereof As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized and that logical, mechanical, electrical and other changes may be made without departing from the scope of the subject matter of this disclosure. The following detailed description is, therefore, provided to describe an exemplary implementation and not to be taken as limiting on the scope of the subject matter described in this disclosure. Certain features from different aspects of the following description may be combined to form yet new aspects of the subject matter discussed below.

DETAILED DESCRIPTION

Computing system security depends on the identification and elimination of malicious software (malware), which can damage the computing system, damage files stored on the computing system, and/or render the computing system unusable or otherwise unstable. Malware has a wide range of forms and variations (e.g., viruses, worms, rootkits, botnets, Trojan horses, etc.) that exploit software vulnerabilities in browsers and operating systems in order to spread, resulting in the launching of distributed denial of service attacks (DDoS), collection of classified information, and other activities that compromise privacy and security. A variety of techniques can be used to identify malware. Certain examples provide artificial intelligence, such as machine learning, deep learning, etc., to identify and/or classify malware. Many malware classifiers involve "explainability" or transparency in the process to identify and classify malware. Certain examples provide transparency to the malware identification/classification process to "explain" or provide an understanding to the computing system regarding how the malware was identified, classified, etc.

Certain examples provide features to a deep learning model in conjunction with extracted strings (e.g., a sequence or array of elements such as characters, other data, etc.) of computer program code to form a deep learning topology that can be modeled and deployed to identify and classify malware. For example, the deep learning topology model construct can be used to process input to predict whether a piece of malware is in a particular family, associated with a particular malware actor, etc.

For example, a convolutional neural network (CNN) topology is merged with a multi-layer perceptron topology to automatically filter and extract significant features from one or more strings (referred to as string features) of a portable executable file. The extracted features are used to train a malware classification machine learning model. The malware classification machine learning model can then be used on similar strings or evolving strings in a customer field to predict maliciousness based on a pattern learned by the model from the strings without manual inspection, identification, and extraction. The malware classification machine learning model forms a multi-class classifier to probabilistically rank Indicators of Compromise (IOCs) for other applications, computer systems, etc., as belonging to a malware family.

IOCs are pieces of forensic data, such as data found in system log entries and/or files, that identify potentially malicious activity on a system, network, etc. Example IOCs include unusual outbound network traffic, anomalies in privileged user account activity, geographical irregularities, log-in red flags, increases in database read volume, hypertext markup language (HTML) response sizes, large numbers of requests for the same file, mismatched port-application traffic, suspicious registry or system file changes, unusual domain name service (DNS) requests, unexpected patching of systems, mobile device profile changes, bundles of data in the wrong place, web traffic with unhuman behavior, signs of distributed denial of service (DDoS) activity, etc.

In certain examples, rules can be defined to identify and classify malware. Models can be trained to implement such rules to identify and/or classify malware, for example. One example of such malware identification rules are rules that look for certain characteristics in the form of textual and/or binary patterns representative of malware. Using such malware identification rules (e.g., Yet Another Recursive/Ridiculous Acronym (YARA) rules, etc.), one or more malware families can be defined to classify identified malware according to the patterns.

For example, one type of malware identification rules are YARA rules, which define a plurality of variables that contain patterns and/or strings found in malware. When a software code sample satisfies a sufficient number of variations or conditions specified by the rule, the sample can be classified as a certain type of malware, for example. An example rule can be constructed using metadata, string(s), and condition(s). In some examples, import(s) can be added to form a rule. Metadata, such as author, data, version, reference, description, hash, etc., can be used to define and explain a rule and its purpose. One or more strings (e.g., confirmed malware strings), such as mutexes, user agents, registry keys, encrypted configuration strings, program database (PDB) paths, etc., can be represented as variables in the rule. In some examples, one or more modifiers (e.g., fullword, wide, nocase, etc.) can be added to a string to fine-tune the malware search. While the string(s) define the rule's search criterion(-ia), condition(s) specify what constitutes a successful match. Conditions can include file header (e.g., indicative of a file type, etc.), file size, number and/or type of matches, etc. In certain examples, imports can include identified strings, libraries (e.g., dynamic linked libraries (DLLs), etc.), application programming interfaces (APIs), etc.

In certain examples, identification rules can be combined with a knowledge base and/or other database of previously identified threat techniques. For example, the MITRE Adversarial Tactics, Techniques, and Common Knowledge (ATT&CK)® framework is a curated knowledge base and model for cyber adversary behavior, reflecting the various phases of an adversary's attack lifecycle and the platforms the adversaries (e.g., malware and others) target. ATT&CK® is a knowledge base of adversary tactics and techniques based on real-world observations. The knowledge base can be used to develop threat models and methodologies to detect and mitigate malware threats and attacks. Techniques defined in the knowledge base or frame can be used for malware detection and mitigation, for example.

As such, certain examples leverage malware identification and/or classification rules along with identified tactics and techniques to drive model-based (e.g., artificial intelligence (AI)-model based, etc.) identification of malware. For example, YARA rules and MITRE ATT&CK techniques can form features in an AI model (e.g., a deep learning model, etc.).

More specifically, rules and techniques can be used to form features in an AI model, such as a deep learning multi-class model, etc., along with static features of a portable executable file (e.g., dynamic-linked library (DLL), object code, etc.) and extracted software code strings. Such a combination used as inputs in a multi-branched deep learning topology can form a model that predicts whether a piece of malware is in a particular family or associated with a particular malware actor, for example. In certain examples, an embedding is used for each attack technique and identification rule, as well as a character level embedding with convolutional neural networks (CNNs). In certain examples, the CNNs can include one or more filters as well as maximum pooling as automatic feature encoders for string features extracted in a malware analysis. Additionally features can be extracted from a portable executable and factored into the model. The features are measurable properties or characteristics that serve to define a model and/or model behavior to process an input (e.g., program code, object code, code string, etc.) to make a determination or prediction.

Apparatus, systems, and methods disclosed herein provide identification of malware as well as explainability of the identification using a hybrid model. In contrast to a traditional, closed AI model, which provides an output without an ability to understand how that output was determined, an explainable AI model enables a user, another system, a process, etc., to understand how the model determined its output. Explainability helps to verify and/or assign a confidence level or score to an identification and/or classification of malware. Explainability provides a basis to justify a decision (e.g., an identification and/or classification), track and verify the decision, and improve related processes. A defensive action taken or a ransom negotiation can be informed by identification of a malware actor and type of malware.

Deep learning technologies often focus on a single paradigm such as video, image, or text. Certain examples provide a single, unified topology combining identification/classification rules with static executable features and/or other file features to identify and classify malware with explainability.

Additionally, text-based extracted features often require custom feature engineering (e.g., using domain knowledge to extract features from raw data) to leverage patterns in the text-based extracted features. Instead, certain examples use string output from a classifier with CNN and/or other deep learning constructs to form features for hybrid or composite model generation in a unified topology. This approach enables agile deployment of new models because new features can be encoded dynamically. Additionally, zero-day malware classification is enabled as dimensionality of text-based features grows and evolves due to new version of products and other software, etc.

Rather than non-deep learning technologies, which are slow in inference and training, or ensembles or hashing functions, which are heavy in size and slow in execution, certain examples provide a hybrid deep learning multi-class model in a unified topology to form a malware classifier. While sparse features lack training set items and lead to very high inaccuracies, apparatus, systems, and methods disclosed herein determine a robust feature set from classification rules, malware attack techniques, static features, and extracted code strings.

Apparatus, systems, and methods disclosed herein use malware classification rules and malware attack techniques as features in a deep learning multi-class model along with static portable executable features and extracted strings. The combination of these features as inputs in a multi-branched deep learning topology form a classifier to predict whether a piece of malware is in a particular family or associated with a particular malware actor.

Rules and attack techniques can be embedded (e.g., a character level embedding, etc.) with one or more deep learning models (e.g., CNNs, etc.) having various filters and max pooling as automatic feature encoders for string features extracted in a malware analysis. Additional features can be extracted from a portable executable associated with the malware analysis. As such, heuristic rules and techniques are leveraged in a combined CNN multi-feature type topology of text, Booleans (e.g., rules), and attack techniques, as well as other static combination(s) of string feature(s) and/or other feature(s) in a unified deep learning topology (e.g., forming an explainable AI (XAI) deep learning topology).

FIG. 1 illustrates an example framework or environment 100 in which an example malware classification apparatus 110 trains and deploys one or more models for malware classification in accordance with teachings disclosed herein. In the example of FIG. 1, the malware classification apparatus 110 includes example feature generator circuitry 120, example model builder circuitry 130, and example model deployer circuitry 140 to provide an example malware classifier 150.

In the example of FIG. 1, example data source circuitry 160 provides one or more portable executables, code strings, etc., to the example feature generator circuitry 120. This content provided to the example feature generator circuitry 120 can be used to train and test and/or otherwise validate a model formed by the example model builder circuitry 130. The example feature generator circuitry 120 extracts features from the set of one or more portable executes, code strings, etc.

For example, a training set of malware portable executables associated with a range of extracted static features is accumulated by the example feature generator circuitry 120 from the example data source circuitry 160. A set of features is extracted such that there are N string features, for example. One or more of the portable executables can also be processed by the feature generator circuitry 120 based on classification rules (e.g., YARA rules, etc.), attack techniques (e.g., Mitre ATT&CK techniques, etc.) to form additional features in the set of features (also referred as a feature set). In certain examples, Boolean, numerical, and/or other features (e.g., string features, choice data, etc.) can be included as an addition or alternative to the rule, and technique-based feature inputs. The Boolean/numeric features can contribute to a vector with longer features forming a concatenated feature vector. For example, the concatenated feature vector can include a hex-encoded representation of Boolean features.

The example model builder circuitry 130 processes the features as input to build a model to form the malware classifier 150. For example, the model builder circuitry 130 processes a sequence of encoded characters as one branch of input. In certain examples, the encoding is done by prescribing an alphabet of size m for the input language, and then quantize each character using 1-of-m encoding (or "one-hot" encoding). Then, the sequence of characters is transformed to a sequence of m-sized vectors with fixed length l. Any character exceeding length l is ignored, and any characters that are not in the alphabet, including blank characters, are quantized as all-zero vectors. The character quantization order is backward so that the latest reading on characters is placed near the beginning of the output. This ordering of the output helps enable fully connected layers of a convolutional neural network (CNN) or other deep learning model construct to associate weights with the latest reading, which also often indicates a version of the associated software. In one example, an alphabet of 256-character features and strings of maximum length fifty can be used with six strings provided to train and/or test the model being developed by the example model builder circuitry 130.

Convolution (e.g., a summing or integration of values) is executed by the example model builder circuitry 130 over a length of each string provided (e.g., over six strings, five strings, ten strings, two strings, etc.). The convolution produces a feature vector including a feature for each string with respect to a number and size of filters used in the unified model network topology being built. The example model builder circuitry 130 performs max-pooling over an output of a specific filter widths to form a tensor of shape [batch_size, 1, 1, num_filters]. The tensor essentially corresponds to a feature vector, in which a last dimension corresponds to the features of the feature vector. Once pooled output tensors have been formed from each filter size, the tensors are combined into one long feature vector of shape [batch_size, num_filters_total]. A convolution topology is formed by the example model builder circuitry 130 for each string feature, and the convolution topologies are used by the model builder circuitry 130 to train a classifier formed of part CNN followed by a number of fully connected layers. The training generates near optimal weights and convolutions for the CNN part of the topology.

The example model builder circuitry 130 then removes a second piece of the trained model, which is the fully connected layers. In certain examples, a last, fully-connected layer is removed after a first training of strings against a plurality of malware families. New outputs are then exposed due to the removal of the last layer. The new outputs are used as features with other known, derived input features (e.g., YARA rules, etc.) to form inputs for a new family targeted training model topology.

The topology can be optimized and/or otherwise improved using additional feature inputs, etc., to generate a malware classifier. For example, the model builder circuitry 130, alone or in conjunction with the model deployer circuitry 140, can refine the model topology through additional testing, training, and/or other validating with feature input data, etc. Once the model has been validated (e.g., by training, testing, etc.), the example model deployer circuitry 140 deploys the model as the example malware classifier 150. Deploying the malware classifier 150 makes the classifier 150 available as a network construct to receive an input (e.g., a string, code extract, executable, object code, etc.) and predict whether the input is/has malware along with a classification of type and an explanation (e.g., a rule, snapshot of model status, etc.) associated with the malware prediction, for example. For example, image technology from the CNN layers can be used to explain parts of the strings that are significant and identify anomalies.

An example computing device circuitry 170 provides software code (e.g., instructions, executable, object code, etc.) to the example malware classifier 150 to determine whether malware is present in the software code. If malware is identified in the software code by the malware classifier 150, the malware can be classified, and the determination of its classification can be explained (e.g., by identifying and/or providing, as part of the output, a rule, technique, and/or other criterion used to determine the classification of the malware).

In certain examples, as the malware classifier 150 is used and output, additional input data, and/or feedback is received, the model builder circuitry 120 can retrain to model topology associated with the classifier 150 to trigger the model deployer circuitry to redeploy the malware classifier 150 periodically, at an interval, when a feedback threshold is reached, etc.

Thus, a convolutional neural network topology is merged with a multi-layer perceptron topology to automatically filter and extract significant features from a string feature of a portable executable file and/or a number of string features to train a malware classification machine learning model forming the malware classifier 150. The malware classifier 150 can then be used on similar strings or evolving strings in a deployment environment to predict maliciousness or malware that is linked to learned patterns in the strings that have not been manually inspected, identified and extracted. The multi-class classifier 150 can then probabilistically rank IOCs as belonging to a malware family, for example.

Figure 2:
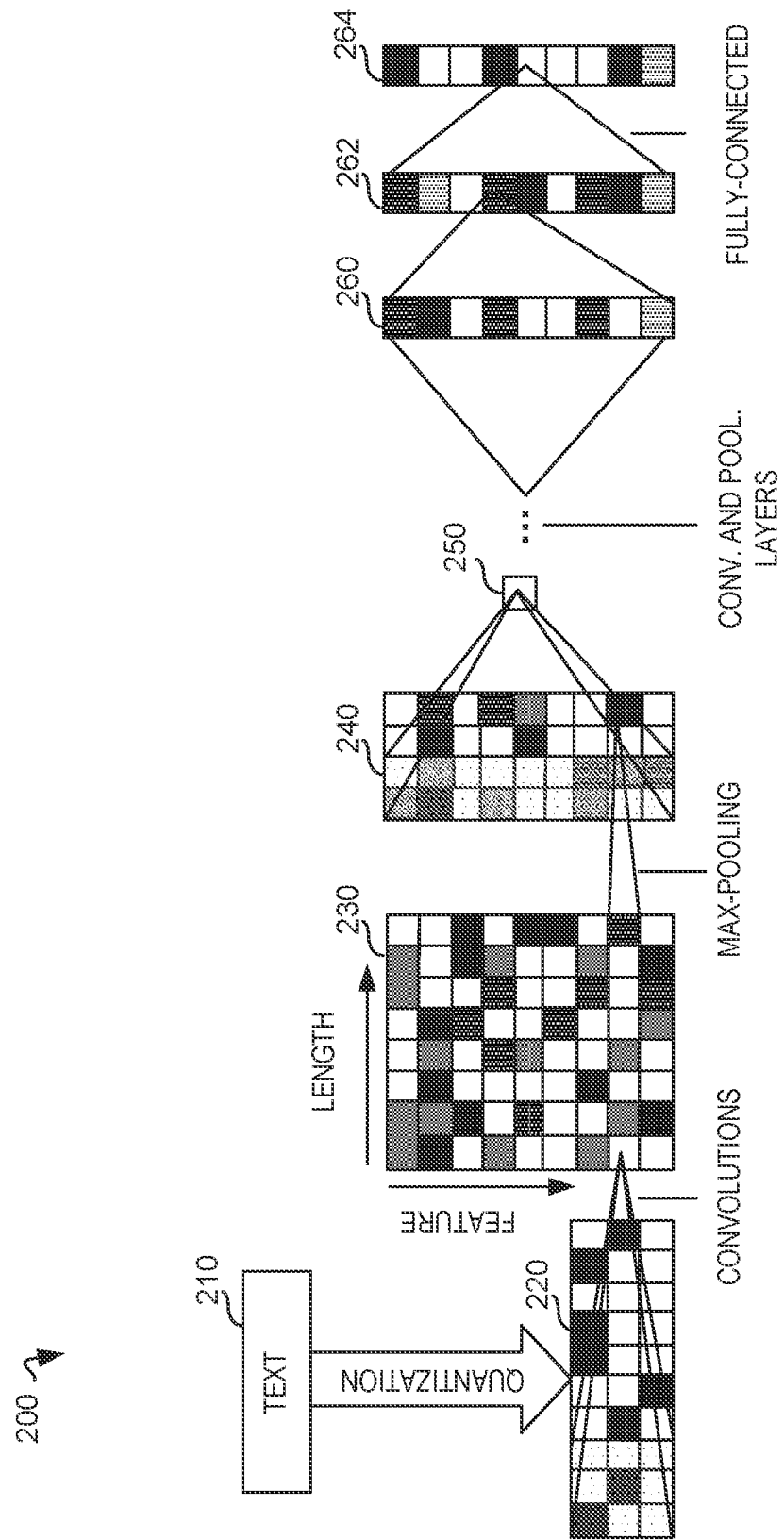
FIG. 2 illustrates an example multi-class network topology used in the example framework of FIG. 1.

FIG. 2 illustrates an example multi-class network topology 200 formed by providing an input 210, e.g., a text-based input (e.g., a string, code snippet, etc.), etc., that is quantized to generate a representation 220 of the text. The representation 220 undergoes convolution to transfer the representation 220 of the text into a feature 230 of a defined length in a reduced dimension space. Using CNNs, for example, allows the example model builder circuitry 130, the example model deployer circuitry 140, and/or the deployed example malware classifier 150 to be "explainable" by pinpointing a portion of a text string, etc., that caused the classifier 150 to detect and classify an item as malware.

As shown in the example of FIG. 2, max pooling is then applied to calculate a maximum value for different patches or groups of the feature 230 (also referred to as a feature map 230) to create a downsampled or pooled feature or feature map 240. For each element 250 for the pooled feature 250, convolution and pool layers connect the feature 250 to a plurality of fully connected layers 260-264 to produce an output prediction of presence (identification) and type (classification) of malware in the input text 210.

Figure 3:
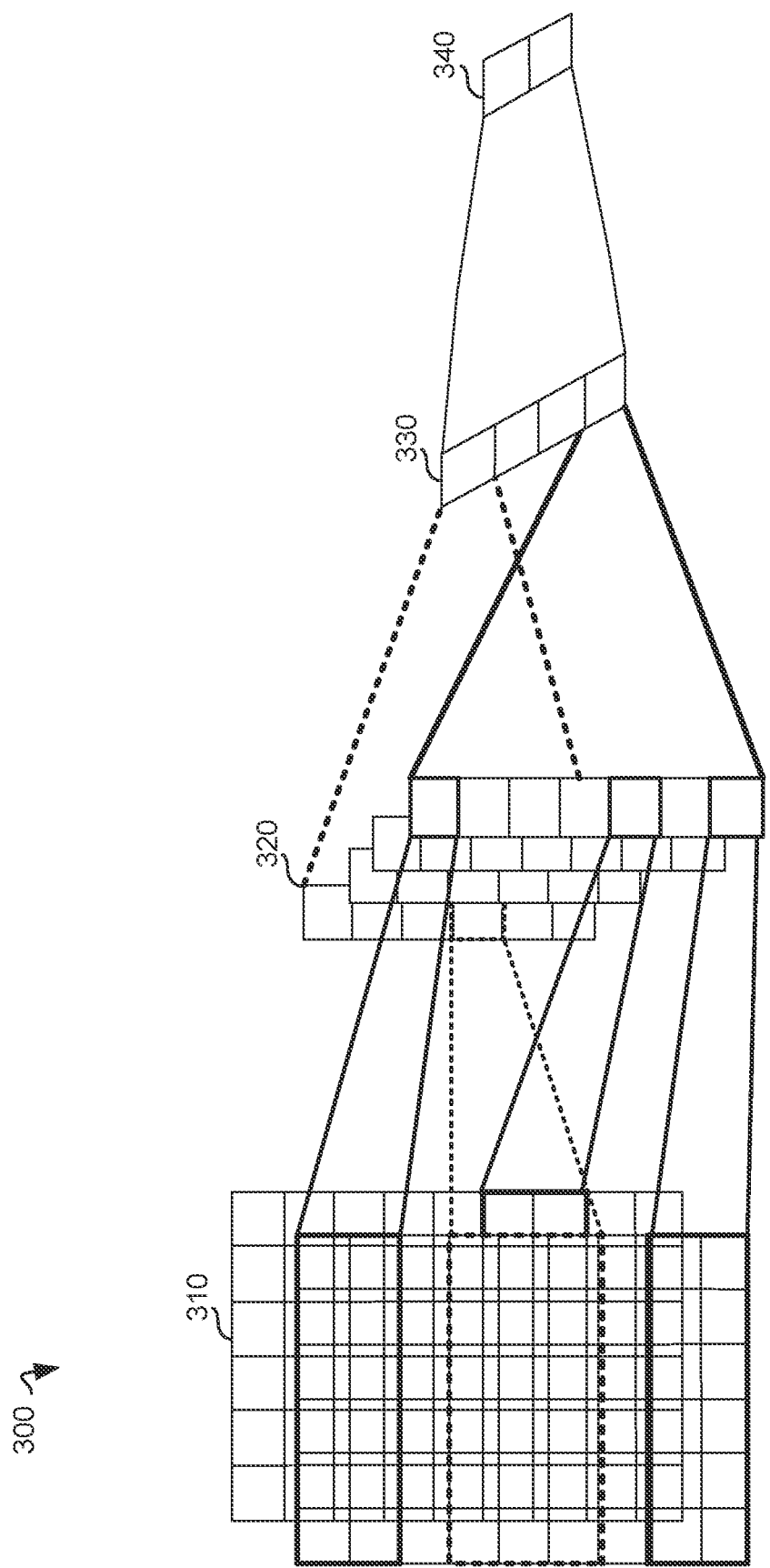
FIG. 3 illustrates an example multi-class network topology used in the example framework of FIG. 1.

FIG. 3 is an alternative illustration 300 of the example multi-class network topology 200 of FIG. 2. As shown in the example of FIG. 3, quantization transforms an input text string (e.g., formulated as a sentence, etc.) into an n×k representation 310 of the text string with static and non-static channels. The representation 310 is further transformed using a convolutional layer 320 with multiple filter widths and feature maps. Max-over-time pooling or downsampling 330 is then applied to the output of the convolutional layer 320, followed by one or more fully connected layers 340. The fully connected layer(s) 340 can include a dropout layer and/or a softmax output layer, for example. The dropout layer can help prevent overfitting of an output. The softmax layer can serve as a normalized exponential function to normalize output to a probability distribution of predicted output classes (e.g., malware types, etc.). As such, output of the softmax layer of the fully connected layers 340 can include a malware classification and an explanation of portion/rule leading to the malware classification, for example.

Figure 4:
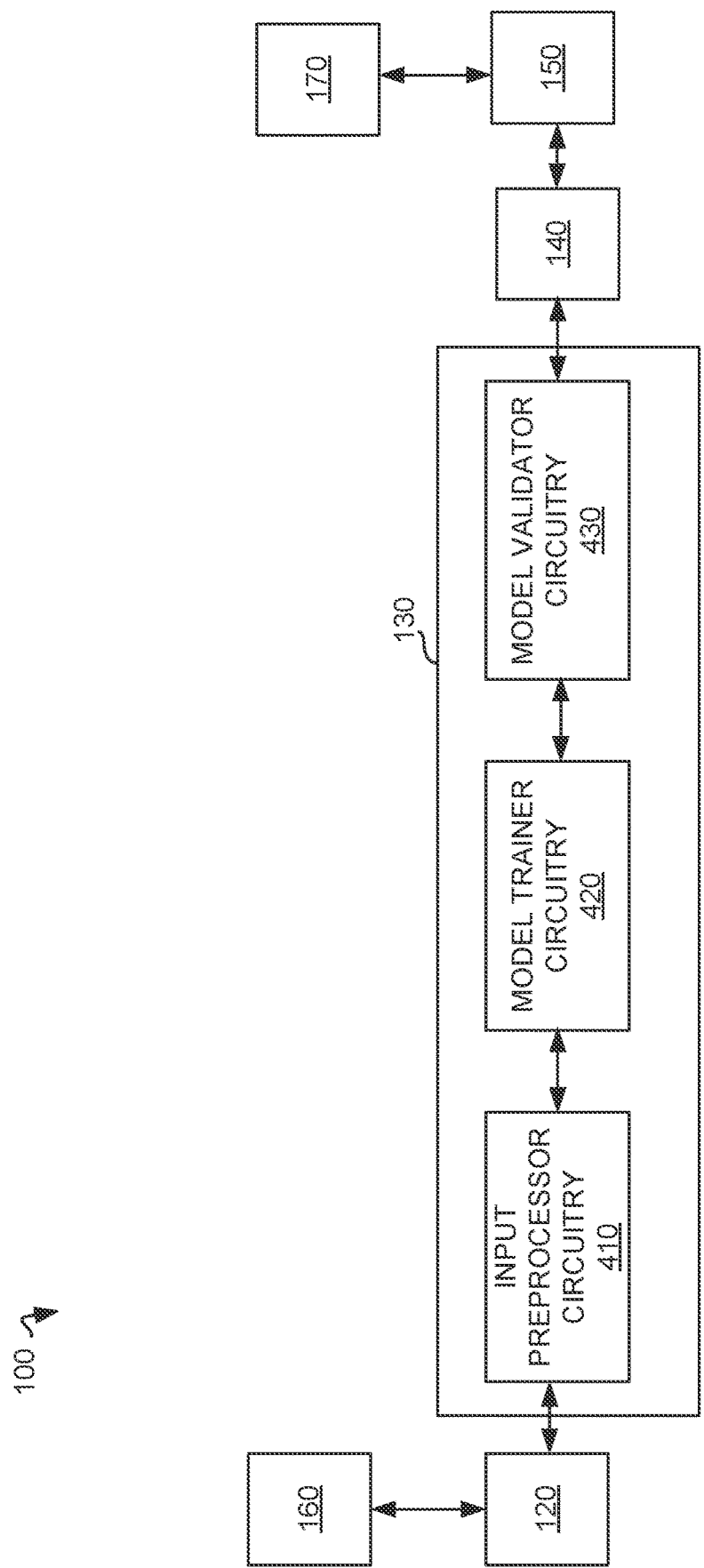
FIG. 4 is a block diagram representative of model builder circuitry that may be implemented in the example framework of FIG. 1.

FIG. 4 is a schematic representation of an implementation of the example model builder circuitry 130 of the example of FIG. 1. The example model builder circuitry 130 includes an example input preprocessor circuitry 410, and example model trainer circuitry 420, and an example model validator circuitry 430.

The example input preprocessor circuitry 410 gathers input content and/or processes input content provided to the input preprocessor circuitry 410 by the example feature generator circuitry 120. The feature generator circuitry 120 forms features from input provided by the example data source circuitry 160, and the input preprocessor circuity 410 prepares those features for use in AI model development. The use of rules (e.g., YARA rules, other heuristic rules, etc.) and techniques (e.g., Mitre ATT&CK techniques, etc.) as features, for example, provides explainability for analysts, consumers, other systems, etc. The example feature generator circuitry 120 processes a long text and/or other code string input to form a feature of a defined length in a reduced dimensional space, for example. In certain examples, additional strings can be processed by the input preprocessor circuitry 410 to become a variation of the existing defined dimensional space, and the content of the added string is projected onto the existing features, for example. The example input preprocessor circuitry 410 can accommodate a variety of input data to form a variety of features, including Boolean features, numerical features, etc., within a single, unified network topology for the example model trainer circuitry 420.

In certain examples, the feature generator circuitry 120 extracts features from one or more portable executables. For example, a historic and/or relevant set of portable executable (PE) files can be collected for reference (e.g., malware, legitimate software, software family, etc.). Static feature vectors can be extracted by the feature generator circuitry 120 for each of the portable executables and provided in feature and/or set of features to the input preprocessor circuitry 410. Any large integer-type features (e.g., file size, etc.) that are extracted can be bucketed into more discrete buckets (e.g., using a random forest algorithm, etc.).

The input preprocessor circuitry 410 converts at least a subset of the extracted features into a numpy array (e.g., a grid of values, all of the same type, indexed by a tuple of nonnegative integers), for example. The numpy array of PE static features can be used as input to train, test, and/or otherwise validate the unified topology model to form the malware classifier 150 with the model trainer circuitry 420 and model validator circuitry 430.

The example model trainer circuitry 420 uses the features from the input preprocessor circuitry 410 to formulate and train a hybrid model. The model trainer circuitry 420 processes feature vectors to generate a CNN topology, such as set forth in the examples of FIGS. 2-3. The feature vectors are convolved by the model trainer circuitry 420 to sum or integrate the feature vectors, pool output tensors resulting from the convolutions, and train a hybrid or composite neural network topology formed of a CNN with additional fully connected layers of a multi-layer perceptron network. Using the pooled tensor features and the fully connected perceptron layers, the example model trainer circuitry 420 can optimize or otherwise improve weights on nodes and associated convolutions for the CNN of the network topology. In certain examples, a last, fully-connected layer is removed after a first training of strings against a plurality of malware families. New outputs are then exposed due to the removal of the last layer. The new outputs can be used as features with other known, derived input features (e.g., YARA rules, etc.) to form inputs for a new family targeted training model topology, for example.

The example model validator circuitry 430 tests the trained CNN and associated fully connected layers of the perceptron network topology from the example model trainer circuitry 420 with additional feature data obtained from the example input preprocessor circuitry 410. The validated model topology is then provided by the example model validator circuitry 430 to the example model deployer circuitry 140.

The model deployer circuitry 140 finalizes and deploys the model as the malware classifier 150. In some examples, the model deployer circuitry 140 removes one or more of the fully connected perceptron layers 260-264, 340 to form the example malware classifier 150 (in some examples, after using the new output(s) for further training, etc.). The multi-class malware classifier 150 can be used to probabilistically rank IOCs as belong to a particular malware family, for example. The example malware classifier 150 is a hybrid, unified topology classifier that processes an input from the computing device circuitry 170 to identify and classify malware in the input and can provide an indication of the rule(s), text portion(s), etc., that resulted in the malware classification.

In certain examples, feedback can be provided from the malware classifier 150, data source circuitry 160, and/or the computing device circuitry 170 to update the model used to form the malware classifier 150. Based on the feedback and/or other additional information, the AI model can be updated and re-deployed as an updated malware classifier 150, for example. Such an update can occur at a set interval, upon reaching a certain amount of feedback, when certain types of input are received, and/or other criterion, for example.

While an example manner of implementing the example model builder circuitry 130 is illustrated in FIG. 4, one or more of the elements, processes, and/or devices illustrated in FIG. 4 may be combined, divided, re-arranged, omitted, eliminated, and/or implemented in any other way. Further, the example input preprocessor circuitry 410, the example model trainer circuitry 420, the example model validator circuitry 430, and/or, more generally, the example model builder circuitry 130 of FIG. 4, may be implemented by hardware, software, firmware, and/or any combination of hardware, software, and/or firmware. Thus, for example, any of the example input preprocessor circuitry 410, the example model trainer circuitry 420, the example model validator circuitry 430, and/or, more generally, the example model builder circuitry 130 of FIG. 4, can be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example input preprocessor circuitry 410, the example model trainer circuitry 420, the example model validator circuitry 430, and/or, more generally, the example model builder circuitry 130 of FIG. 4 is/are hereby expressly defined to include a non-transitory computer readable storage device or storage disk such as a memory, a digital versatile disk (DVD), a compact disk (CD), a Blu-ray disk, etc., including the software and/or firmware. Further still, the example model builder circuitry 130 of FIG. 4 may include one or more elements, processes, and/or devices in addition to, or instead of, those illustrated in FIG. 4, and/or may include more than one of any or all of the illustrated elements, processes and devices.

In certain examples, the feature generator circuitry 120 provide means for generating feature vectors from a first input. The example model builder circuitry 130 provides means for training a neural network model using a first portion of the feature vectors, the means for training to add one or more fully connected layers to the trained neural network model to form a hybrid model and validate the hybrid model using a second portion of the feature vectors. The example model deployer circuitry 140 provides means for deploying the validated hybrid model as a malware classifier, the malware classifier to provide a malware classification with explainability in response to a second input.

Figure 5:
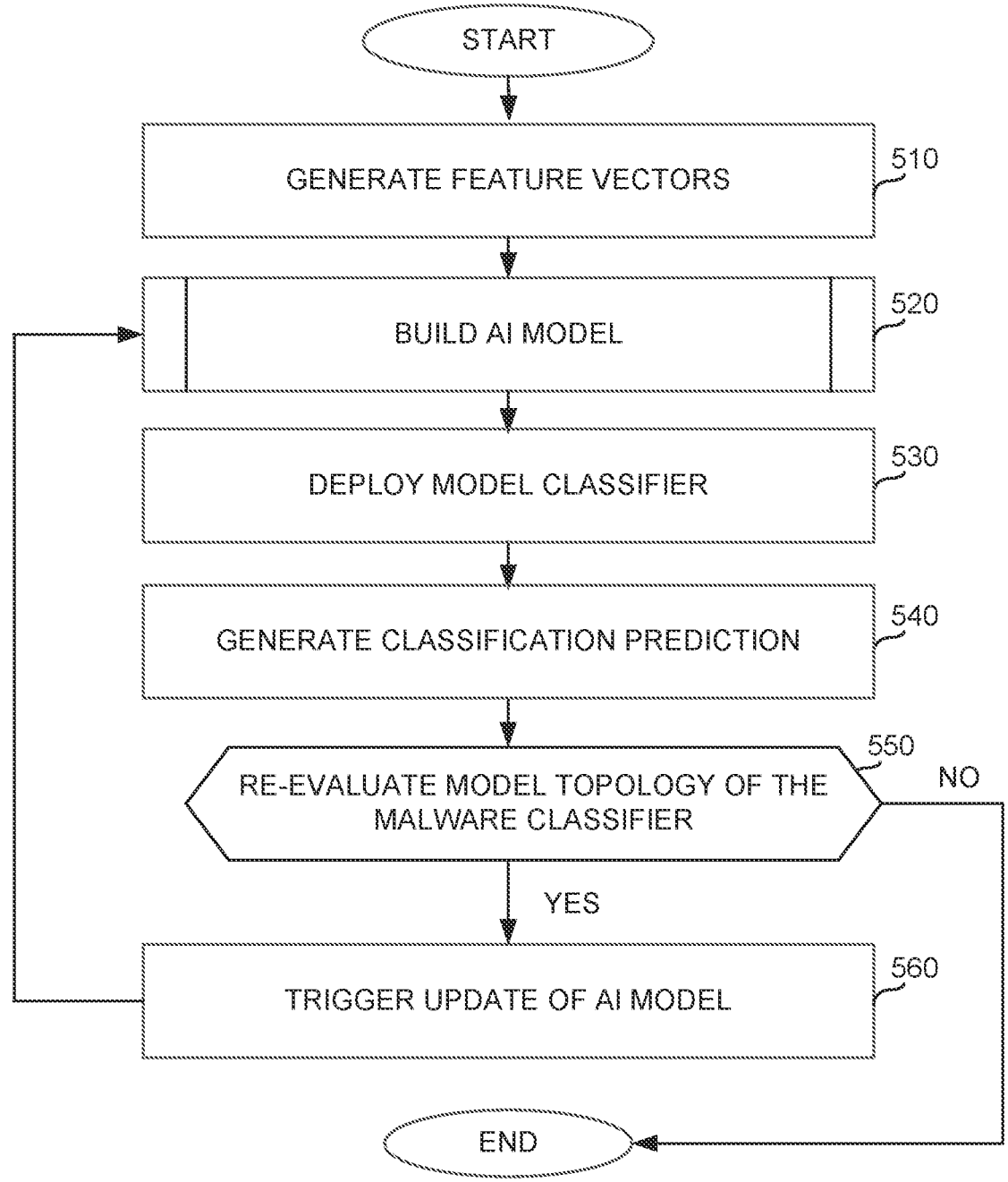
FIG. 5 is a flowchart representative of machine readable instructions which may be executed to implement the malware classification apparatus of FIGS. 1, 2, 3, and/or 4.
Figure 6:
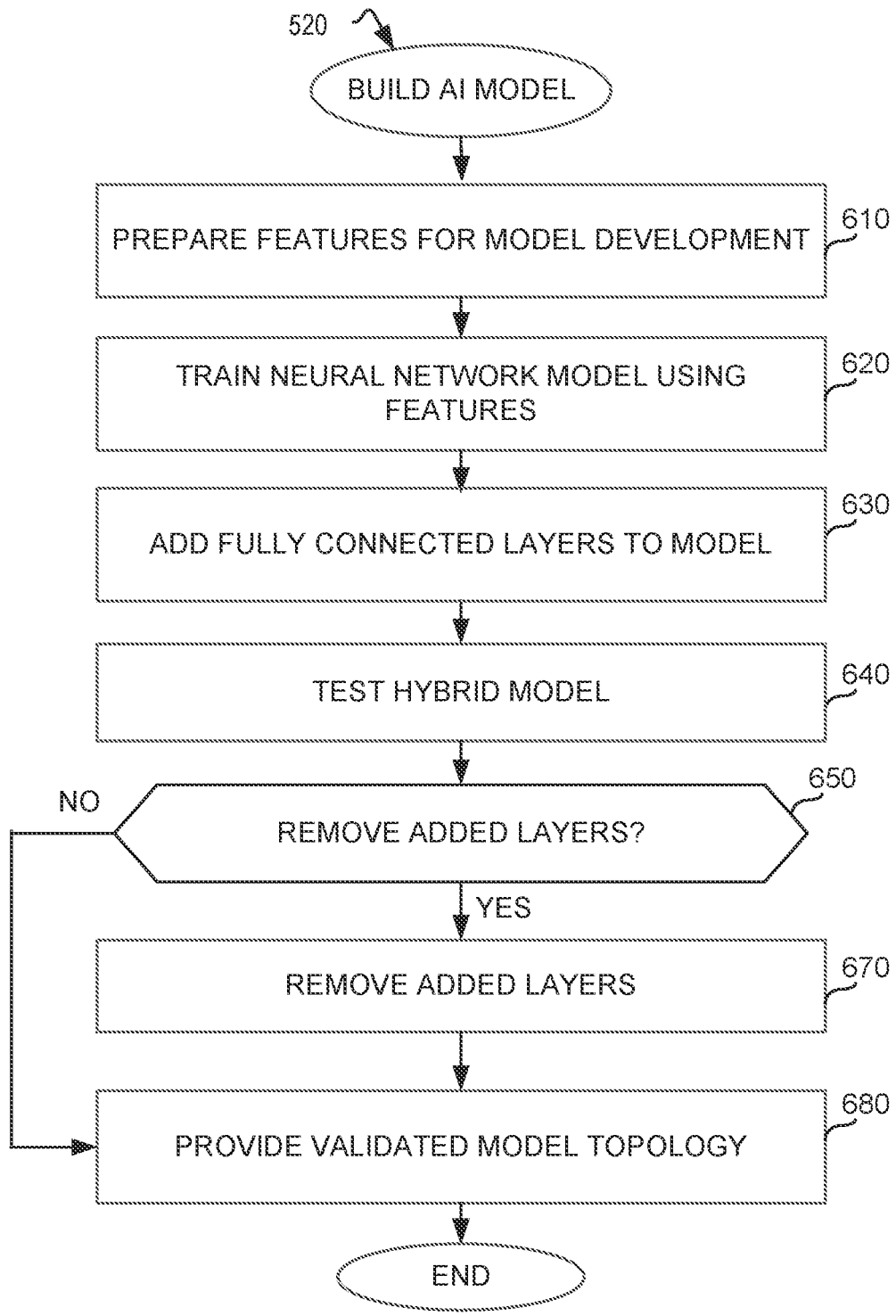
FIG. 6 is a flowchart representative of machine readable instructions which may be executed to implement the model builder circuitry of FIGS. 1, 2, 3, and/or 4.

Flowcharts representative of example hardware logic circuitry, machine readable instructions, hardware implemented state machines, and/or any combination thereof for implementing the model builder circuitry 130 of FIG. 4, and, more generally, the malware classification apparatus 110 of FIGS. 1-4, are shown in FIGS. 5, 6, and/or 7. The machine readable instructions may be one or more executable programs or portion(s) of an executable program for execution by processor circuitry, such as the processor circuitry 812 shown in the example processor platform 800 discussed below in connection with FIG. 8 and/or the example processor circuitry discussed below in connection with FIGS. 9 and/or 10. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 5-7, many other methods of implementing the example model builder circuitry 130 of FIG. 4 and/or, more generally, the example malware classification apparatus 110, may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 5-7 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 5 is a flowchart representative of machine readable instructions 500 which may be executed to implement the example malware classification apparatus 110 of FIGS. 1, 2, 3, and/or 4. In the example of FIG. 5, the feature generator circuitry 120 processes input from one or more data sources including the data source circuitry 160 to generate feature vectors that can be used to build an AI model (block 510). For example, text strings, extracts from portable executables, Boolean features, numeric features, etc., can be formed from data source input and provided to the example model builder circuitry 130.

The model builder circuitry 130 uses the features to build the AI model by training and testing layers in a unified network topology (block 520). For example, the model builder circuitry 130 forms a hybrid CNN with fully-connected perceptron network layers in a unified topology, and trains and tests the topology using the extracted features.

Once the model builder circuitry 130 has trained and tested or otherwise validated the hybrid AI model topology, the model deployer circuitry 140 prepares and deploys the malware classifier 150 based on the validated model (block 530). The deployed malware classifier 150 can then be used, such as by the example computing device circuitry 170. In response to an input from the computing device circuitry 170, the malware classifier 150 processes the input and generates a prediction of a malware classification associated with the input (e.g., no malware, etc.) (block 540). The output of the malware classifier 150 can be a malware type with or without an indication of a rule, technique, code portion/string/snippet, etc., explaining the classification result.

As such, the malware classifier 150 can be created for a particular malware family to identify malware in the same or similar family with a high level of detail. The example malware classifier 150, however, also has the flexibility, through the model, to detect malware even when an actor is changing some of the malware code, based on the flexibility and robustness of the model forming the classifier 150. In some examples, a more general malware classifier 150, such as a "ransomware" classifier, etc., can be generated to classify code on a more generic overlap of characteristics typical for ransomware, etc. An output of the malware classifier 150 can be provided to endpoint detection engine circuitry and/or other circuitry that detects and investigates suspicious activity on hosts and endpoints to identify and respond to threats.

Periodically (e.g., based on an interval or threshold) and/or based on some threshold, the model builder circuitry 130 re-evaluates the model topology forming the malware classifier 150 (block 550). For example, based on feedback associated with classification results, new malware definitions, new features, etc., the model builder circuitry 130 can re-generate, optimize, and/or otherwise improve the model topology, resulting in an updated malware classifier 150 deployed by the model deployer circuitry 140 (block 560).

FIG. 6 is a flowchart representative of example machine readable instructions 520 which may be executed to build the AI model topology in accordance with the example of FIG. 5. In the example of FIG. 6, the input preprocessor circuitry 410 processes feature vectors and/or other feature data to prepare the features for use in developing the AI model (block 610). For example, the input preprocessor circuitry 410 converts at least a subset of features extracted by the feature generator circuitry 120 into an array (e.g., a numpy array, etc.), for example. The array of PE static features can be used as input to train, test, and/or otherwise validate the unified topology model to form the malware classifier 150 with the model trainer circuitry 420 and model validator circuitry 430.

As described above, features can be formed by the feature generator circuitry 120 from input provided by the example data source circuitry 160, and the input preprocessor circuity 410 prepares those features for use in AI model development. The use of rules (e.g., YARA rules, other heuristic rules, etc.) and techniques (e.g., Mitre ATT&CK techniques, etc.) as features, for example, provides explainability for analysts, consumers, other systems, etc. The example feature generator circuitry 120 processes a long text and/or other code string input to form a feature of a defined length in a reduced dimensional space, for example. In certain examples, additional strings can be processed by the input preprocessor circuitry 410 to become a variation of the existing defined dimensional space, and the content of the added string is projected onto the existing features, for example. The example input preprocessor circuitry 410 can accommodate a variety of input data to form a variety of features, including Boolean features, numerical features, etc., within a single, unified network topology for the example model trainer circuitry 420.

In certain examples, the feature generator circuitry 120 extracts features from one or more portable executables. For example, a historic and/or relevant set of portable executable (PE) files can be collected for reference (e.g., malware, legitimate software, software family, etc.). Static feature vectors can be extracted by the feature generator circuitry 120 for each of the portable executables and provided in feature and/or set of features to the input preprocessor circuitry 410. Any large integer-type features (e.g., file size, etc.) that are extracted can be bucketed into more discrete buckets (e.g., using a random forest algorithm, etc.).

The example model trainer circuitry 420 uses the features from the input preprocessor circuitry 410 to formulate and train a neural network model (block 620). The model trainer circuitry 420 processes feature vectors to generate a CNN topology, such as set forth in the examples of FIGS. 2-3. The feature vectors are convolved by the model trainer circuitry 420 to sum or integrate the feature vectors, pool output tensors resulting from the convolutions, and train the neural network topology. The model trainer circuitry 420 adds one or more fully connected layers of a multi-layer perceptron network to the CNN to form a unified, hybrid neural network topology (block 630). Using the pooled tensor features and the fully connected perceptron layers, the example model trainer circuitry 420 can optimize or otherwise improve weights on nodes and associated convolutions for the CNN of the network topology.

The example model validator circuitry 430 tests the trained CNN and associated fully connected layers of the perceptron network topology from the example model trainer circuitry 420 with additional feature data obtained from the example input preprocessor circuitry 410 (block 640). In certain examples, after testing and/or otherwise validating the hybrid model, the model validator circuitry 430 can remove the fully connected layers of the perceptron network, leaving the trained, validated CNN and/or other deep learning neural network model for deployment (blocks 650, 670). In certain examples, a last, fully-connected layer is removed after a first training of strings against a plurality of malware families. New outputs are then exposed due to the removal of the last layer. The new outputs are used as features with other known, derived input features (e.g., YARA rules, etc.) to form inputs for a new family targeted training model topology. The validated model topology is then provided by the example model validator circuitry 430 to the example model deployer circuitry 140, which generates the malware classifier 150 and deploys the malware classifier 150 for use (block 680).

Figure 7:
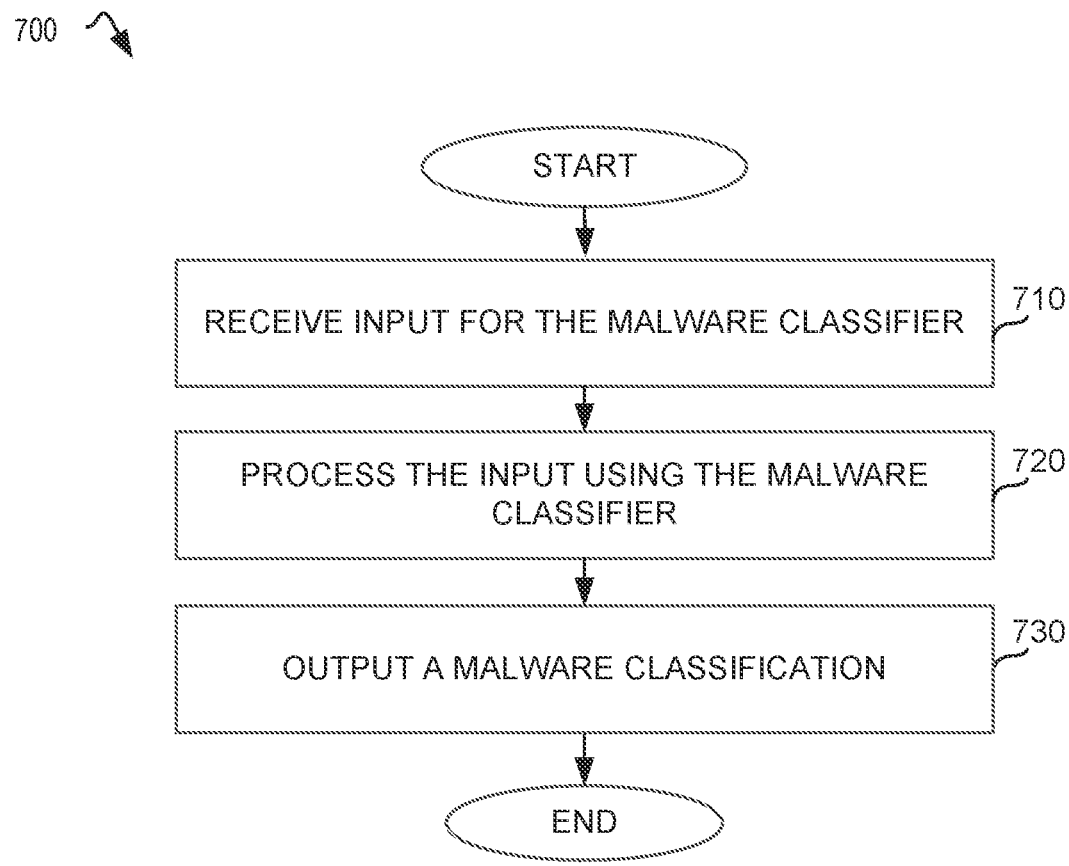
FIG. 7 is a flowchart representative of machine readable instructions which may be executed to implement the malware classifier of FIGS. 1, 2, 3, and/or 4.

FIG. 7 is a flowchart representative of machine readable instructions 700 which may be executed to implement the example malware classifier 150 of FIGS. 1, 2, 3, and/or 4. In the example of FIG. 7, the malware classifier 150 receives a string and/or other portion of code from a source of potential malware, such as the example computing device circuitry 170, as input to the classifier 150 (block 710). For example, a text string, code snippet, object code, etc., can be received as input to the malware classifier 150.

The malware classifier 150 processes the input (block 720). For example, the layers of the model forming the malware classifier 150 process the input features. The layers and nodes of the malware classifier 150 apply a variety of rules (e.g., YARA rules, etc.) and techniques (e.g., Mitre ATT&CK techniques, etc.) to the input features to identify and classify malware in the input.

The malware classifier 150 outputs a prediction of malware classification associated with the input (block 730). In certain examples, the output includes the malware type or classification along with an image or other of a relevant portion of the topology that determined the classification of the malware. For example, a portion of the input, a rule, a technique, etc., resulting in the malware classification can be provided with the classification to provide an explanation or justification for the malware classification.

Figure 8:
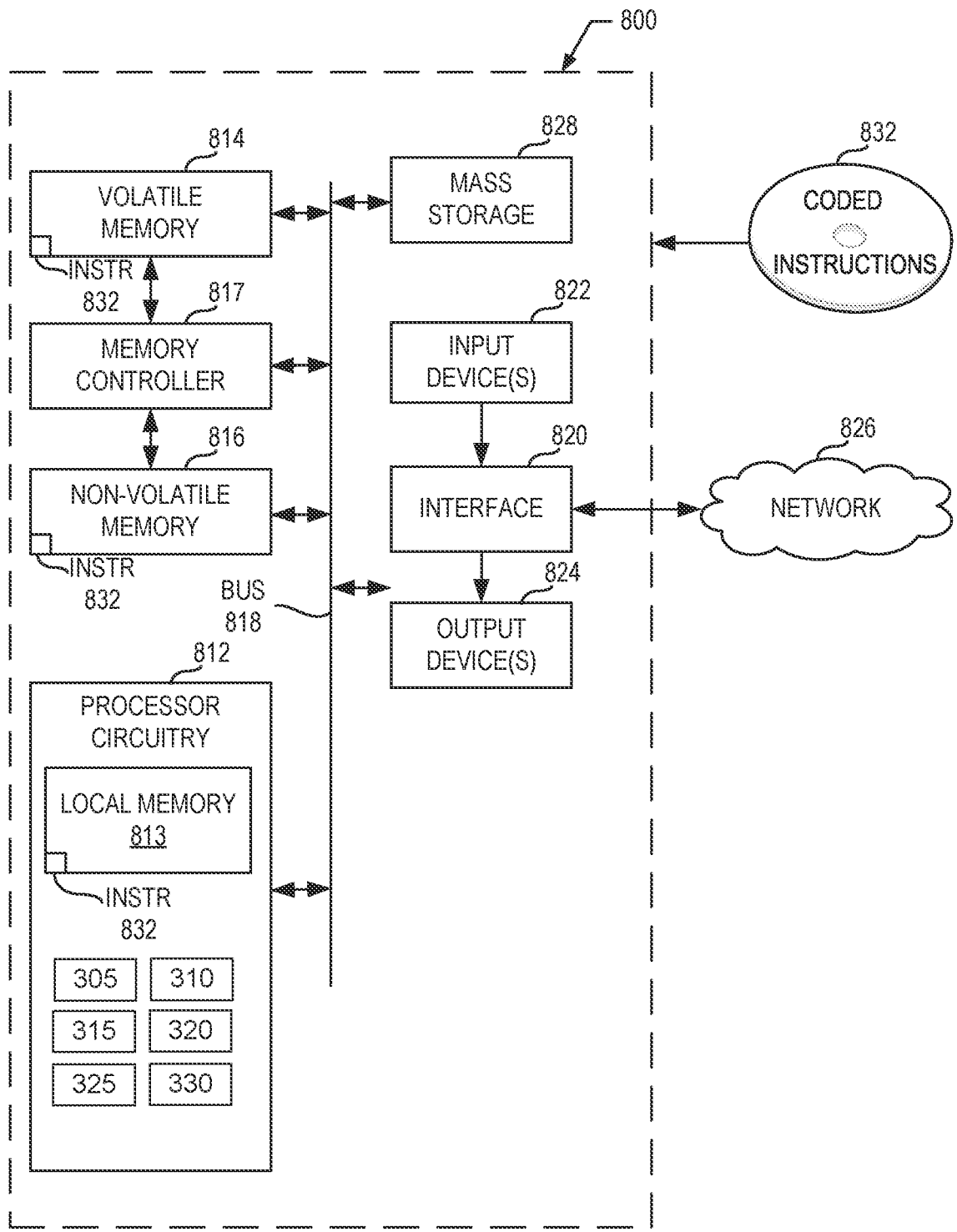
FIG. 8 is a block diagram of an example processing platform structured to execute the instructions of FIGS. 5, 6, and/or 7 to implement the malware classification apparatus of FIGS. 1, 2, 3, and/or 4.

FIG. 8 is a block diagram of an example processing platform 800 structured to execute the instructions of FIGS. 5, 6, and/or 7 to implement the malware classification apparatus 110 of FIGS. 1, 2, 3, and/or 4. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device. The processor platform 800 of the illustrated example includes processor circuitry 812. The processor circuitry 812 of the illustrated example is hardware. For example, the processor circuitry 812 can be implemented by one or more integrated circuits, logic circuits, FPGAs microprocessors, CPUs, GPUs, DSPs, and/or microcontrollers from any desired family or manufacturer. The processor circuitry 812 may be implemented by one or more semiconductor based (e.g., silicon based) devices. In this example, the processor circuitry 812 implements the feature generator circuitry 120, the model builder circuitry 130, and/or the model deployer circuitry 140. The same or similar processor circuitry can be used to implement the data source circuitry 160 and/or the computing device circuitry 170, for example.

The processor circuitry 812 of the illustrated example includes a local memory 613 (e.g., a cache, registers, etc.). The processor circuitry 812 of the illustrated example is in communication with a main memory including a volatile memory 814 and a non-volatile memory 816 by a bus 818. The volatile memory 814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 816 may be implemented by flash memory and/or any other desired type of memory device. Access to the main memory 814, 816 of the illustrated example is controlled by a memory controller 817.

The processor platform 800 of the illustrated example also includes interface circuitry 820. The interface circuitry 820 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 822 are connected to the interface circuitry 820. The input device(s) 822 permit(s) a user to enter data and/or commands into the processor circuitry 812. The input device(s) 802 can be implemented by, for example, an audio sensor, a microphone, a camera (still or video), a keyboard, a button, a mouse, a touchscreen, a track-pad, a trackball, an isopoint device, and/or a voice recognition system.

One or more output devices 824 are also connected to the interface circuitry 820 of the illustrated example. The output devices 824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 820 of the illustrated example, thus, typically includes a graphics driver card, a graphics driver chip, and/or graphics processor circuitry such as a GPU.

The interface circuitry 820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 826. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 800 of the illustrated example also includes one or more mass storage devices 828 to store software and/or data. Examples of such mass storage devices 828 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 832, which may be implemented by the machine readable instructions of FIGS. 5-7, may be stored in the mass storage device 828, in the volatile memory 814, in the non-volatile memory 816, and/or on a removable non-transitory computer readable storage medium such as a CD or DVD.

Figure 9:
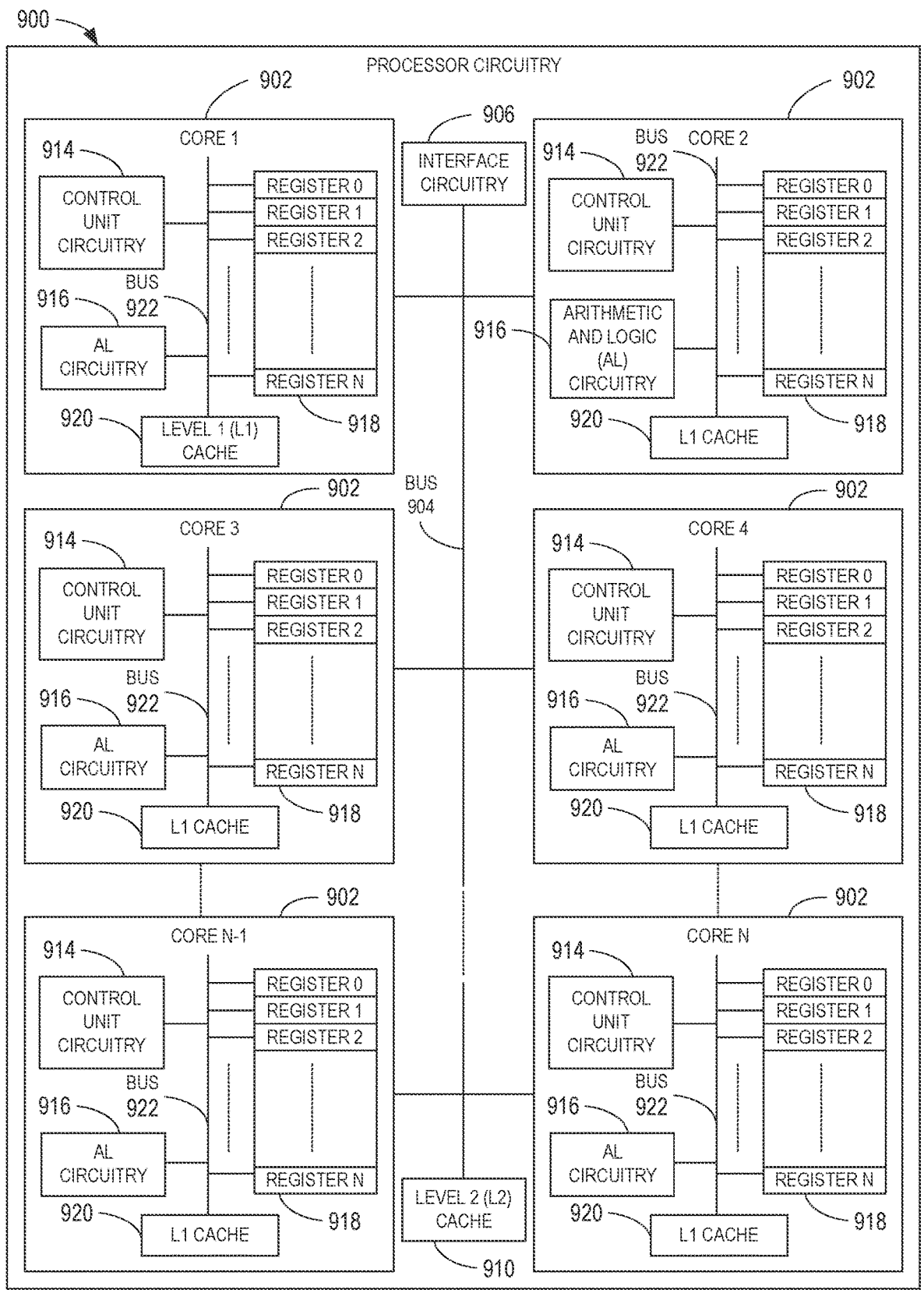
FIG. 9 is a block diagram of an example implementation of the processor circuitry of FIG. 8.

FIG. 9 is a block diagram of an example implementation of the processor circuitry 800 of FIG. 8. In this example, the processor circuitry 812 of FIG. 8 is implemented by a microprocessor 900. For example, the microprocessor 900 may implement multi-core hardware circuitry such as a CPU, a DSP, a GPU, an XPU, etc. Although it may include any number of example cores 902 (e.g., 1 core), the microprocessor 900 of this example is a multi-core semiconductor device including N cores. The cores 902 of the microprocessor 700 may operate independently or may cooperate to execute machine readable instructions. For example, machine code corresponding to a firmware program, an embedded software program, or a software program may be executed by one of the cores 902 or may be executed by multiple ones of the cores 902 at the same or different times. In some examples, the machine code corresponding to the firmware program, the embedded software program, or the software program is split into threads and executed in parallel by two or more of the cores 902. The software program may correspond to a portion or all of the machine readable instructions and/or operations represented by the flowcharts of FIGS. 5-7.

The cores 902 may communicate by an example bus 704. In some examples, the bus 904 may implement a communication bus to effectuate communication associated with one(s) of the cores 902. For example, the bus 904 may implement at least one of an Inter-Integrated Circuit (I2C) bus, a Serial Peripheral Interface (SPI) bus, a PCI bus, or a PCIe bus. Additionally or alternatively, the bus 904 may implement any other type of computing or electrical bus. The cores 902 may obtain data, instructions, and/or signals from one or more external devices by example interface circuitry 906. The cores 902 may output data, instructions, and/or signals to the one or more external devices by the interface circuitry 906. Although the cores 902 of this example include example local memory 920 (e.g., Level 1 (L1) cache that may be split into an L1 data cache and an L1 instruction cache), the microprocessor 900 also includes example shared memory 910 that may be shared by the cores (e.g., Level 2 (L2_cache)) for high-speed access to data and/or instructions. Data and/or instructions may be transferred (e.g., shared) by writing to and/or reading from the shared memory 910. The local memory 920 of each of the cores 902 and the shared memory 910 may be part of a hierarchy of storage devices including multiple levels of cache memory and the main memory (e.g., the main memory 814, 816 of FIG. 8). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 902 may be referred to as a CPU, DSP, GPU, etc., or any other type of hardware circuitry. Each core 902 includes control unit circuitry 914, arithmetic and logic (AL) circuitry (sometimes referred to as an ALU) 916, a plurality of registers 918, the L1 cache 920, and an example bus 922. Other structures may be present. For example, each core 902 may include vector unit circuitry, single instruction multiple data (SIMD) unit circuitry, load/store unit (LSU) circuitry, branch/jump unit circuitry, floating-point unit (FPU) circuitry, etc. The control unit circuitry 914 includes semiconductor-based circuits structured to control (e.g., coordinate) data movement within the corresponding core 902. The AL circuitry 916 includes semiconductor-based circuits structured to perform one or more mathematic and/or logic operations on the data within the corresponding core 902. The AL circuitry 916 of some examples performs integer based operations. In other examples, the AL circuitry 916 also performs floating point operations. In yet other examples, the AL circuitry 916 may include first AL circuitry that performs integer based operations and second AL circuitry that performs floating point operations. In some examples, the AL circuitry 916 may be referred to as an Arithmetic Logic Unit (ALU). The registers 918 are semiconductor-based structures to store data and/or instructions such as results of one or more of the operations performed by the AL circuitry 916 of the corresponding core 902. For example, the registers 918 may include vector register(s), SIMD register(s), general purpose register(s), flag register(s), segment register(s), machine specific register(s), instruction pointer register(s), control register(s), debug register(s), memory management register(s), machine check register(s), etc. The registers 918 may be arranged in a bank as shown in FIG. 9. Alternatively, the registers 918 may be organized in any other arrangement, format, or structure including distributed throughout the core 902 to shorten access time. The bus 922 may implement at least one of an I2C bus, a SPI bus, a PCI bus, or a PCIe bus.

Each core 902 and/or, more generally, the microprocessor 900 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 900 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 10:
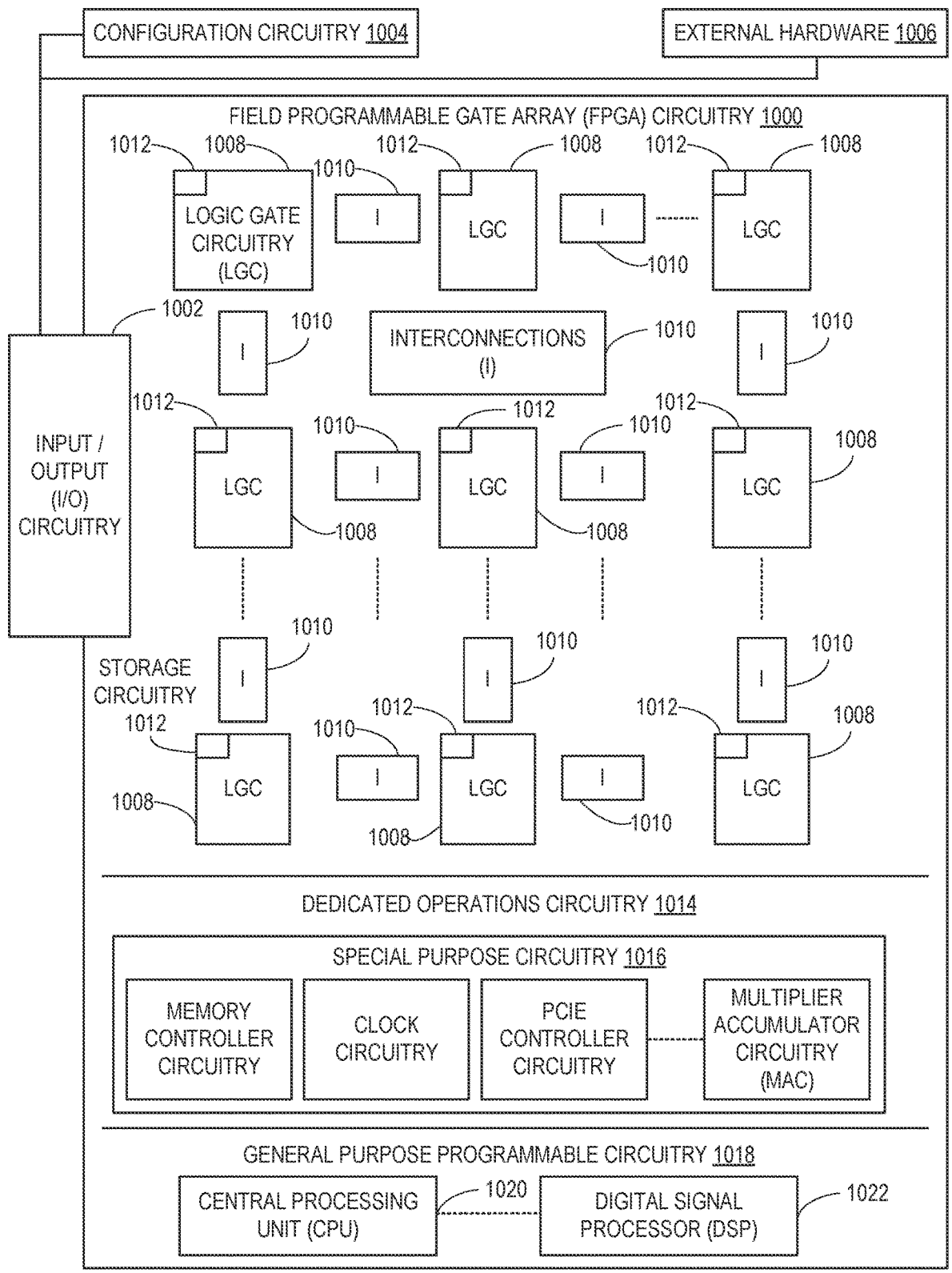
FIG. 10 is a block diagram of another example implementation of the processor circuitry of FIG. 8.

FIG. 10 is a block diagram of another example implementation of the processor circuitry 800 of FIG. 8. In this example, the processor circuitry 812 is implemented by FPGA circuitry 1000. The FPGA circuitry 1000 can be used, for example, to perform operations that could otherwise be performed by the example microprocessor 900 of FIG. 97 executing corresponding machine readable instructions. However, once configured, the FPGA circuitry 1000 instantiates the machine readable instructions in hardware and, thus, can often execute the operations faster than they could be performed by a general purpose microprocessor executing the corresponding software.

More specifically, in contrast to the microprocessor 900 of FIG. 9 described above (which is a general purpose device that may be programmed to execute some or all of the machine readable instructions represented by the flowcharts of FIGS. 5-7 but whose interconnections and logic circuitry are fixed once fabricated), the FPGA circuitry 1000 of the example of FIG. 10 includes interconnections and logic circuitry that may be configured and/or interconnected in different ways after fabrication to instantiate, for example, some or all of the machine readable instructions represented by the flowcharts of FIGS. 5-7. In particular, the FPGA 1000 may be thought of as an array of logic gates, interconnections, and switches. The switches can be programmed to change how the logic gates are interconnected by the interconnections, effectively forming one or more dedicated logic circuits (unless and until the FPGA circuitry 1000 is reprogrammed). The configured logic circuits enable the logic gates to cooperate in different ways to perform different operations on data received by input circuitry. Those operations may correspond to some or all of the software represented by the flowcharts of FIGS. 5-7. As such, the FPGA circuitry 1000 may be structured to effectively instantiate some or all of the machine readable instructions of the flowcharts of FIGS. 5-7 as dedicated logic circuits to perform the operations corresponding to those software instructions in a dedicated manner analogous to an ASIC. Therefore, the FPGA circuitry 1000 may perform the operations corresponding to the some or all of the machine readable instructions of FIGS. 5-7 faster than the general purpose microprocessor can execute the same.

In the example of FIG. 10, the FPGA circuitry 1000 is structured to be programmed (and/or reprogrammed one or more times) by an end user by a hardware description language (HDL) such as Verilog. The FPGA circuitry 1000 of FIG. 10, includes example input/output (I/O) circuitry 1002 to obtain and/or output data to/from example configuration circuitry 1004 and/or external hardware (e.g., external hardware circuitry) 1006. For example, the configuration circuitry 1004 may implement interface circuitry that may obtain machine readable instructions to configure the FPGA circuitry 1000, or portion(s) thereof. In some such examples, the configuration circuitry 1004 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1006 may implement the microprocessor 900 of FIG. 9. The FPGA circuitry 1000 also includes an array of example logic gate circuitry 1008, a plurality of example configurable interconnections 1010, and example storage circuitry 1012. The logic gate circuitry 1008 and interconnections 1010 are configurable to instantiate one or more operations that may correspond to at least some of the machine readable instructions of FIGS. 5-7 and/or other desired operations. The logic gate circuitry 1008 shown in FIG. 10 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1008 to enable configuration of the electrical structures and/or the logic gates to form circuits to perform desired operations. The logic gate circuitry 1008 may include other electrical structures such as look-up tables (LUTs), registers (e.g., flip-flops or latches), multiplexers, etc.

The interconnections 1010 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1008 to program desired logic circuits.

The storage circuitry 1012 of the illustrated example is structured to store result(s) of the one or more of the operations performed by corresponding logic gates. The storage circuitry 1012 may be implemented by registers or the like. In the illustrated example, the storage circuitry 1012 is distributed amongst the logic gate circuitry 1008 to facilitate access and increase execution speed.

The example FPGA circuitry 1000 of FIG. 10 also includes example Dedicated Operations Circuitry 1014. In this example, the Dedicated Operations Circuitry 1014 includes special purpose circuitry 1016 that may be invoked to implement commonly used functions to avoid the need to program those functions in the field. Examples of such special purpose circuitry 1016 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1000 may also include example general purpose programmable circuitry 1018 such as an example CPU 1020 and/or an example DSP 822. Other general purpose programmable circuitry 1018 may additionally or alternatively be present such as a GPU, an XPU, etc., that can be programmed to perform other operations.

Although FIGS. 9 and 10 illustrate two example implementations of the processor circuitry 812 of FIG. 8 many other approaches are contemplated. For example, as mentioned above, modern FPGA circuitry may include an on-board CPU, such as one or more of the example CPU 1020 of FIG. 10. Therefore, the processor circuitry 912 of FIG. 9 may additionally be implemented by combining the example microprocessor 900 of FIG. 9 and the example FPGA circuitry 1000 of FIG. 10. In some such hybrid examples, a first portion of the machine readable instructions represented by the flowcharts of FIGS. 5-7 may be executed by one or more of the cores 1002 of FIG. 10 and a second portion of the machine readable instructions represented by the flowchart of FIGS. 5-7 may be executed by the FPGA circuitry 1000 of FIG. 10.

In some examples, the processor circuitry 1012 of FIG. 10 may be in one or more packages. For example, the processor circuitry 900 of FIG. 9 and/or the FPGA circuitry 1000 of FIG. 10 may be in one or more packages. In some examples, an XPU may be implemented by the processor circuitry 812 of FIG. 8 which may be in one or more packages. For example, the XPU may include a CPU in one package, a DSP in another package, a GPU in yet another package, and an FPGA in still yet another package.

Figure 11:
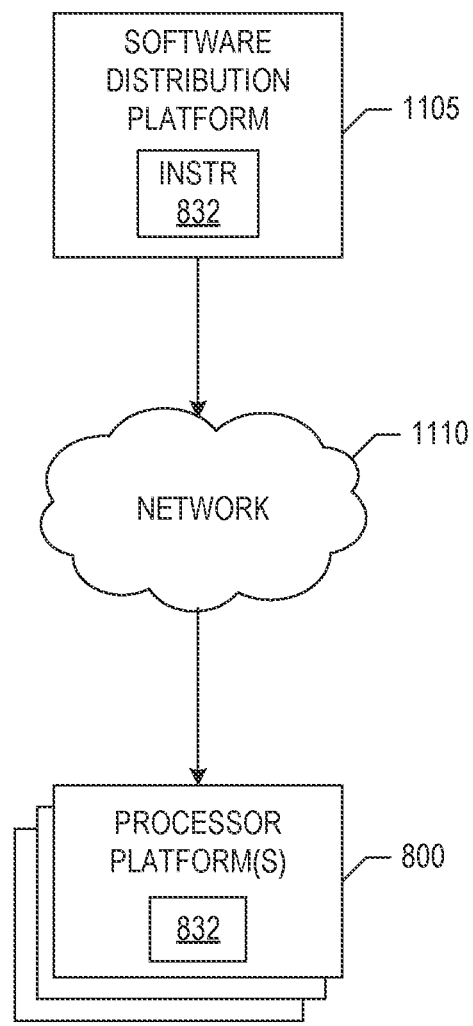
FIG. 11 is a block diagram of an example software distribution platform (e.g., one or more servers) to distribute software (e.g., software corresponding to the example machine readable instructions of FIGS. 5, 6, and/or 7) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1105 to distribute software such as the example machine readable instructions 832 of FIG. 8 to hardware devices owned and/or operated by third parties is illustrated in FIG. 11. The example software distribution platform 1105 may be implemented by any computer server, data facility, cloud service, etc., capable of storing and transmitting software to other computing devices. The third parties may be customers of the entity owning and/or operating the software distribution platform 1105. For example, the entity that owns and/or operates the software distribution platform 1105 may be a developer, a seller, and/or a licensor of software such as the example machine readable instructions 832 of FIG. 8. The third parties may be consumers, users, retailers, OEMs, etc., who purchase and/or license the software for use and/or re-sale and/or sub-licensing. In the illustrated example, the software distribution platform 1105 includes one or more servers and one or more storage devices. The storage devices store the machine readable instructions 832 which may correspond to the example machine readable instructions of FIGS. 5-7, as described above. The one or more servers of the example software distribution platform 1105 are in communication with a network 1110, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 832 from the software distribution platform 1105. For example, the software, which may correspond to the example machine readable instructions of FIGS. 5-7, may be downloaded to the example processor platform 800 which is to execute the machine readable instructions 832 to implement the example malware classification apparatus 110. In some examples, one or more servers of the software distribution platform 1105 periodically offer, transmit, and/or force updates to the software (e.g., the example machine readable instructions 832 of FIG. 8) to ensure improvements, patches, updates, etc., are distributed and applied to the software at the end user devices.

From the foregoing, it will be appreciated that apparatus, systems, and methods disclosed herein introduce an improved, hybrid model with a single unified topology leveraging malware identification rules (e.g., YARA rules, other heuristic rules, etc.), threat detection techniques (e.g., Mitra ATT&CK techniques, etc.), etc. Apparatus, systems, and methods disclosed herein accelerate identification of new IOCs from customer data. Apparatus, systems, and methods enable automatic reduction in dimensionality to form a high accuracy machine learning-based malware classifier. Static features, text strings, Boolean features, numeric features, etc., can be used within a single, unified network topology according to apparatus, systems, and methods disclosed herein. Using apparatus, systems, and methods disclosed herein, a long text string associated with software code and/or executable is transformed into a feature of a defined length in a reduced dimensional space. Additional strings can become a variation of the existing dimensional space, wherein the content of the string projects onto existing features. Apparatus, systems, and methods disclosed herein provide fast inferencing through convolutional neural networks along with explainability to pinpoint a string that caused the malware classifier to detect an item and determine a malware type/classification.

Further examples and combinations thereof include the following:

Example 1 is an apparatus to classify malware with explainability. The example apparatus includes: at least one memory; instructions; and processor circuitry to execute the instructions to: generate feature vectors from a first input; train a neural network model using a first portion of the feature vectors; add one or more fully connected layers to the trained neural network model to form a hybrid model; validate the hybrid model using a second portion of the feature vectors; and deploy the validated hybrid model as a malware classifier, the malware classifier to provide a malware classification with explainability in response to a second input.

Example 2 includes the apparatus of example 1, wherein the processor circuitry is to remove the one or more fully connected layers to expose new outputs.

Example 3 includes the apparatus of example 1, wherein the one or more fully connected layers form a multi-layer perceptron network.

Example 4 includes the apparatus of example 1, wherein the neural network model includes a convolutional neural network model with max pooling.

Example 5 includes the apparatus of example 1, wherein the features include at least one of malware identification rules or threat techniques.

Example 6 includes the apparatus of example 1, wherein the features include static features extracted from a portable executable.

Example 7 includes the apparatus of example 1, wherein the processor circuitry is to update the hybrid model to deploy an updated malware classifier based on at least one of feedback and new input.

Example 8 includes the apparatus of example 1, wherein the malware classifier is to provide explainability by indicating a portion of the second input resulting in the malware classification.

Example 9 includes the apparatus of example 8, wherein the second input includes a string feature of at least one of an executable or software code.

Example 10 is a non-transitory computer readable storage medium including instructions which, when executed, cause at least one processor to at least: generate feature vectors from a first input; train a neural network model using a first portion of the feature vectors; add one or more fully connected layers to the trained neural network model to form a hybrid model; validate the hybrid model using a second portion of the feature vectors; and deploy the validated hybrid model as a malware classifier, the malware classifier to provide a malware classification with explainability in response to a second input.

Example 11 includes the non-transitory computer readable storage medium of example 10, wherein the instructions, when executed, cause the at least one processor to remove the one or more fully connected layers after validating the hybrid model.

Example 12 includes the non-transitory computer readable storage medium of example 10, wherein the first input includes a portable executable and wherein the instructions, when executed, cause the at least one processor to extract static features from the portable executable.

Example 13 includes the non-transitory computer readable storage medium of example 10, wherein the instructions, when executed, cause the at least one processor to update the hybrid model to deploy an updated malware classifier based on at least one of feedback and new input.

Example 14 includes the non-transitory computer readable storage medium of example 10, wherein the instructions, when executed, cause the at least one processor to provide explainability by indicating a portion of the second input resulting in the malware classification.

Example 15 is a method to classify malware with explainability, the method including: generating, by executing an instruction with a processor, feature vectors from a first input; training, by executing an instruction with the processor, a neural network model using a first portion of the feature vectors; adding, by executing an instruction with the processor, one or more fully connected layers to the trained neural network model to form a hybrid model; validating, by executing an instruction with the processor, the hybrid model using a second portion of the feature vectors; and deploying, by executing an instruction with the processor, the validated hybrid model as a malware classifier, the malware classifier to provide a malware classification with explainability in response to a second input.

Example 16 includes the method of example 15, further including removing the one or more fully connected layers.

Example 17 includes the method of example 15, wherein the first input includes a portable executable and further including extracting static features from the portable executable.

Example 18 includes the method of example 15, further including updating the hybrid model to deploy an updated malware classifier based on at least one of feedback and new input.

Example 19 includes the method of example 15, wherein explainability is provided by indicating a portion of the second input resulting in the malware classification.

Example 20 is an apparatus including: means for generating feature vectors from a first input; means for training a neural network model using a first portion of the feature vectors, the means for training to add one or more fully connected layers to the trained neural network model to form a hybrid model and validate the hybrid model using a second portion of the feature vectors; and means for deploying the validated hybrid model as a malware classifier, the malware classifier to provide a malware classification with explainability in response to a second input.

Example 21 includes the apparatus of any preceding example, wherein at least a last fully connected layer of the neural network model is to be removed after a first training, and wherein outputs of the neural network model are used as features in a second targeted training to form the hybrid model.

Example 22 includes the method of any preceding example, wherein at least a last fully connected layer of the neural network model is to be removed after a first training, and wherein outputs of the neural network model are used as features in a second targeted training to form the hybrid model.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus to enable a malware classification with explainability, the apparatus comprising:
   memory circuitry;
   instructions; and
   processor circuitry to execute the instructions to:
   generate feature vectors from a first input;
   train a neural network model using a first portion of the feature vectors;
   add one or more fully connected layers to the trained neural network model to form a hybrid model;
   validate the hybrid model using a second portion of the feature vectors; and
   deploy the validated hybrid model as a malware classifier, the malware classifier to provide the malware classification with explainability in response to a second input.

2. The apparatus of claim 1, wherein the processor circuitry is to remove the one or more fully connected layers to expose new outputs.

3. The apparatus of claim 1, wherein the one or more fully connected layers form a multi-layer perceptron network.

4. The apparatus of claim 1, wherein the neural network model includes a convolutional neural network model with max pooling.

5. The apparatus of claim 1, wherein the feature vectors include at least one of malware identification rules or threat techniques.

6. The apparatus of claim 1, wherein the feature vectors include static features extracted from a portable executable.

7. The apparatus of claim 1, wherein the processor circuitry is to update the hybrid model to deploy an updated malware classifier based on at least one of feedback and new input.

8. The apparatus of claim 1, wherein the malware classifier is to provide explainability by indicating a portion of the second input resulting in the malware classification.

9. The apparatus of claim 8, wherein the second input includes a string feature of at least one of an executable or software code.

10. A non-transitory computer readable storage medium comprising instructions which, when executed, cause at least one processor to at least:
generate feature vectors from a first input;
train a neural network model using a first portion of the feature vectors;
add one or more fully connected layers to the trained neural network model to form a hybrid model;
validate the hybrid model using a second portion of the feature vectors; and
deploy the validated hybrid model as a malware classifier, the malware classifier to provide a malware classification with explainability in response to a second input.

11. The non-transitory computer readable storage medium of claim 10, wherein the instructions, when executed, cause the at least one processor to remove the one or more fully connected layers after validating the hybrid model.

12. The non-transitory computer readable storage medium of claim 10, wherein the first input includes a portable executable and wherein the instructions, when executed, cause the at least one processor to extract static features from the portable executable.

13. The non-transitory computer readable storage medium of claim 10, wherein the instructions, when executed, cause the at least one processor to update the hybrid model to deploy an updated malware classifier based on at least one of feedback and new input.

14. The non-transitory computer readable storage medium of claim 10, wherein the instructions, when executed, cause the at least one processor to provide explainability by indicating a portion of the second input resulting in the malware classification.

15. A method to enable malware classification with explainability, the method comprising:
generating, by executing an instruction with processor circuitry, feature vectors from a first input;
training, by executing an instruction with the processor circuitry, a neural network model using a first portion of the feature vectors;
adding, by executing an instruction with the processor circuitry, one or more fully connected layers to the trained neural network model to form a hybrid model;
validating, by executing an instruction with the processor circuitry, the hybrid model using a second portion of the feature vectors; and
deploying, by executing an instruction with the processor circuitry, the validated hybrid model as a malware classifier, the malware classifier to provide a malware classification with explainability in response to a second input.

16. The method of claim 15, further including removing the one or more fully connected layers.

17. The method of claim 15, wherein the first input includes a portable executable and further including extracting static features from the portable executable.

18. The method of claim 15, further including updating the hybrid model to deploy an updated malware classifier based on at least one of feedback and new input.

19. The method of claim 15, wherein explainability is provided by indicating a portion of the second input resulting in the malware classification.

20. An apparatus comprising:
means for generating feature vectors from a first input;
means for training a neural network model using a first portion of the feature vectors, the means for training to add one or more fully connected layers to the trained neural network model to form a hybrid model and validate the hybrid model using a second portion of the feature vectors; and
means for deploying the validated hybrid model as a malware classifier, the malware classifier to provide a malware classification with explainability in response to a second input.

* * * * *